Patented Nov. 25, 1947

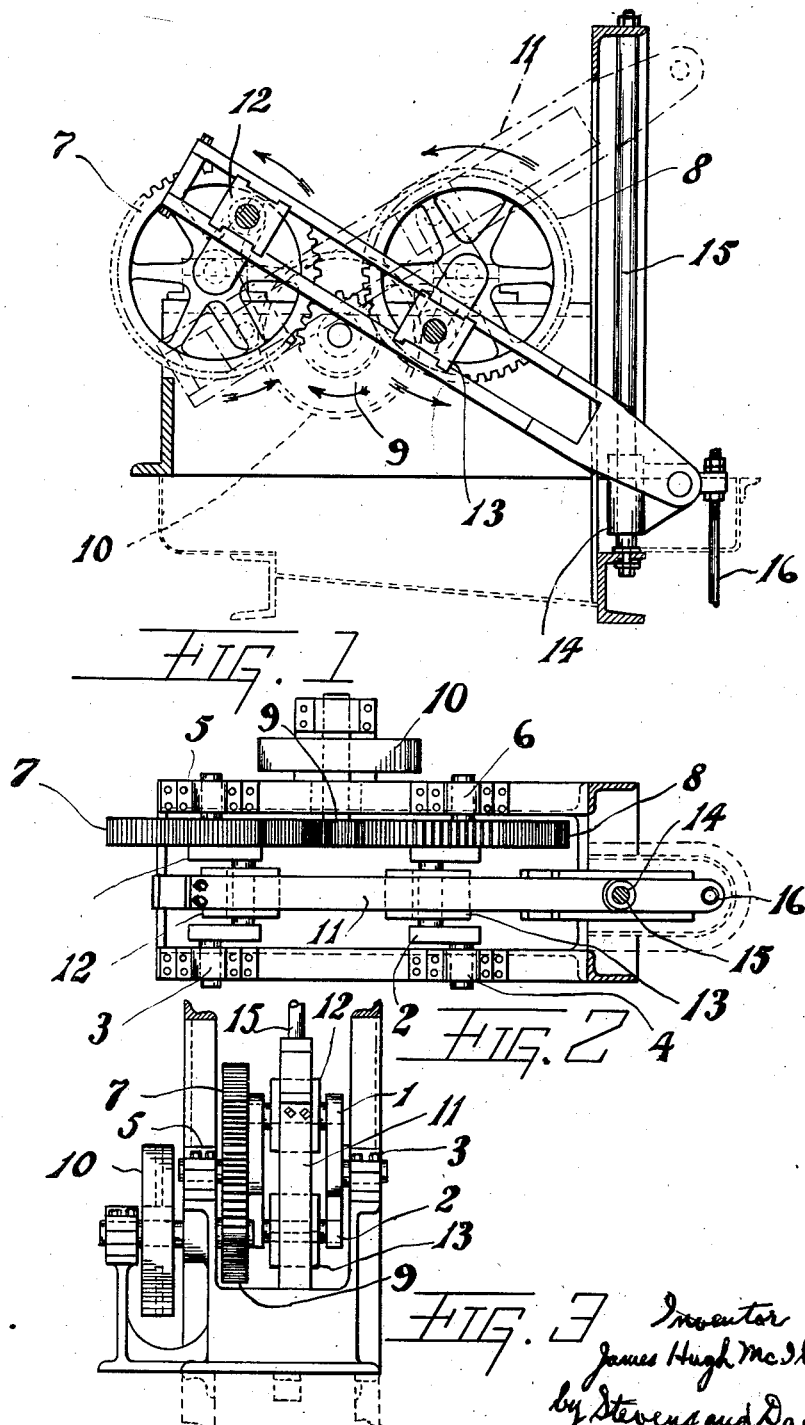

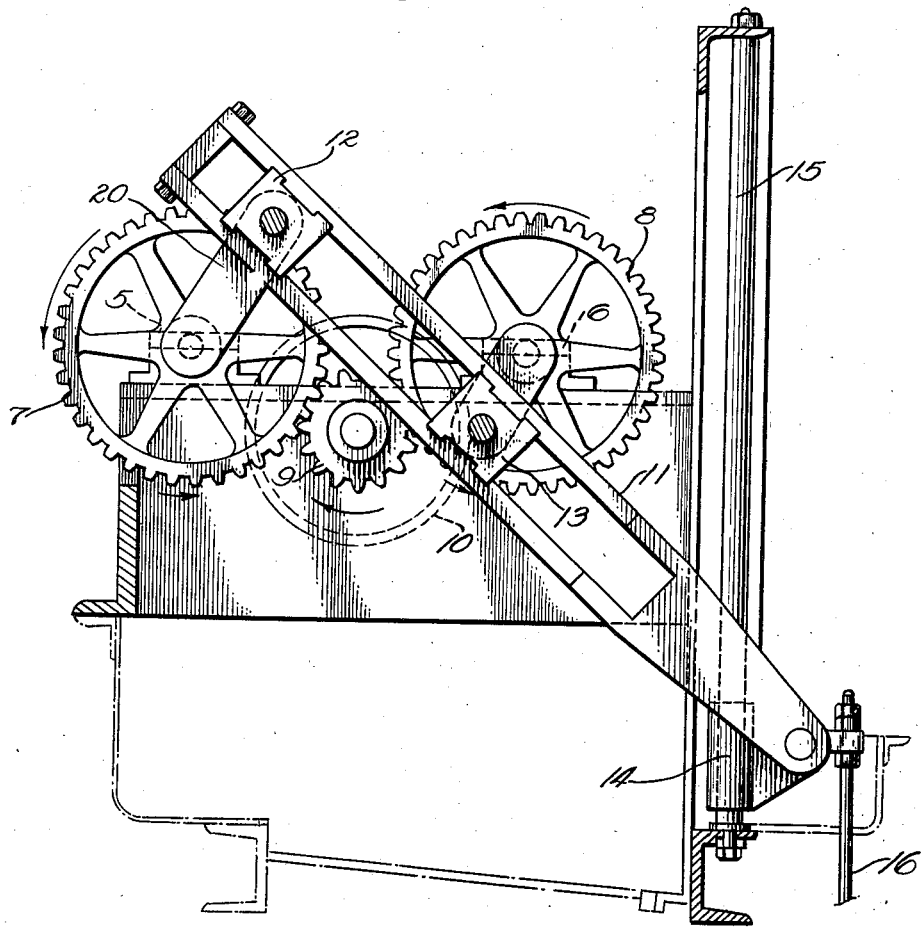

2,431,493

UNITED STATES PATENT OFFICE 2,431,493

MECHANICAL DEVICE FOR CONVERTING ROTARY MOTION INTO RECIPROCATORY MOTION, AND VICE VERSA

James Hugh McIlrath, Hatfield, Pretoria, Transvaal, Union of South Africa

Application July 21, 1944, Serial No. 545,912. In the Union of South Africa September 29, 1943

4 Claims. (Cl. 74—45)

This invention relates to an improved mechanical device for the purpose of converting rotary motion into reciprocatory motion and vice versa.

According to the invention the device comprises two spaced parallel cranks or the equivalent, which are positively interconnected so that they can be caused to rotate in the same direction and at the same angular velocity, and a slotted lever arm connecting said cranks or the like which are so set relatively to one another that on rotation thereof an end of said slotted lever arm by being guided can be made to transmit rectilinear reciprocatory motion to a working part connected thereto and vice versa.

It is to be understood that the relative setting of the two cranks or the like is such that, during rotation, they alternatively approach and recede from one another with the result that the moments of leverage vary from a maximum to a minimum during each complete revolution. Actually the device is in the nature of a lever fulcrumed intermediately of its ends and having a continuously moving fulcrum as well as a continuously moving point of application of the levering force.

From the aforegoing description it will be understood that the mechanism gives a quick return motion which makes it suitable for numerous applications. The device is particularly suitable for use as a power head for a pump.

The two cranks or the like form part of or are driven by two parallel shafts which are interconnected by spur or chain gearing. In one form the cranks are formed by crank pins projecting from the faces of two gear wheels each mounted on the end of a shaft which two shafts are interconnected by the provision of an idler gear wheel or pinion arranged between and meshing with both the aforesaid gear wheels carrying the crank pins. Alternatively a chain drive may be employed to synchronize the rotary motion of the two shafts.

The said lever arm need only be slotted where it engages with the crank pins.

When the device forms the power head of a pump, the operative end of the lever arm is connected to a cross-head arranged for vertically sliding movement on suitable guides, while the pump rod is connected to the cross-head.

An advantage of the device is that a relatively long stroke can be obtained by the use of relatively small diameter crank wheels or the like since the extent of movement of the operative end of the lever arm is largely governed by the distance between the crank pin circles.

In another use of the device, the reciprocatory motion of a piston or the like which is connected to the said operative end of the lever arm, can be converted into rotary motion.

To enable the invention to be more clearly understood and carried into practice, reference is now made to the accompanying drawings in which like references denote like parts throughout the several views.

In the drawings—

Figure 1 is a cross sectional side elevation of a device constructed according to the invention, and adapted for use as a power head for a pump.

Figure 2 is a plan view, taken of the device shown in Figure 1.

Figure 3 is an end view of the device shown in Figures 1 and 2, and

Figure 4 is a view similar to Figure 1, but showing one crank having a greater throw than the other.

Referring to the drawings, references 1 and 2 denote the two cranks, the shafts of which on one side are journalled in bearings 3 and 4, while on the other side the shafts are journalled in bearings 5 and 6, where they have keyed to them the gear wheels 7 and 8 which both mesh with the gear pinion 9 which is adapted to be driven by the pulley 10.

The two cranks 1 and 2, are connected to the slotted lever arm 11 by means of the sliding crossheads 12 and 13. The front end of said slotted lever 11 is guided by means of the slipper 14 engaging with the vertical guide rod 15.

The pump rod 16 is likewise attached to the front end of said slotted lever arm 11, as clearly shown in Figure 1.

The full-line position of the slotted lever arm 11 in Figure 1 represents the bottom position or end of the downward stroke. The arrows in Figure 1 indicate the direction of rotation of the gear wheels and pinion. As shown in Figure 1, the lever arm 11 is just about to commence its upward stroke, and it will be noted that, as the cranks 1 and 2 rotate in the directions indicated, they will be at the furthest distance apart when the slotted lever arm 11 has reached the mid-stroke position, that is on the upward stroke. The broken line outline shows the position at the top of the stroke. On the downward stroke the cranks 1 and 2 approach one another, and at mid-stroke they will be in line horizontally, and therefore at their nearest positions to one another. It will accordingly be understood from the above description, that a greater mechanical advantage is obtained on the upstroke than on the down stroke, which naturally gives a quick-return motion.

As illustrated, the two cranks 1 and 2 have the same throw. The invention is, however, not limited in this respect since one crank or its equivalent may be arranged to have a larger throw than the other, depending upon the duty required from the mechanism.

Figure 4 shows this modification in which the crank arm 20 of the gear wheel 7 is substantially longer than the crank arm of the gear wheel 8.

What I claim is:

1. A device for converting rotary motion to reciprocatory motion and vice versa which comprises, two spaced cranks, means interconnecting said cranks to rotate said cranks in the same direction and at the same angular velocity, said cranks being so disposed that they alternately approach and recede from each other, a slotted lever arm connecting said cranks and wholly supported thereby intermediate its ends, and guiding means associated with one end of said lever arm, said end of said lever arm moving in a rectilinear reciprocatory path.

2. A device as claimed in claim 1 wherein the means interconnecting said cranks is gearing.

3. A device as claimed in claim 1 wherein said cranks are of equal throw.

4. A device as claimed in claim 1 wherein said cranks are of unequal throw.

JAMES HUGH McILRATH.

REFERENCES CITED

The following references are of record in the file of this patent:

UNITED STATES PATENTS

| Number | Name | Date |
| --- | --- | --- |
| 317,929 | Cox | May 12, 1885 |
| 1,804,577 | Walter | May 12, 1931 |

FOREIGN PATENTS

| Number | Country | Date |
| --- | --- | --- |
| 618,473 | France | Mar. 10, 1927 |